(12) United States Patent
Arnold et al.

(10) Patent No.: US 8,997,586 B2
(45) Date of Patent: Apr. 7, 2015

(54) MASS FLOW MEASURING OR CONTROLLING DEVICE

(71) Applicant: Buerkert Werke GmbH, Ingelfingen (DE)

(72) Inventors: Armin Arnold, Assamstadt (DE); Juergen Wiedemann, Ingelfingen (DE)

(73) Assignee: Buerkert Werke GmbH, Ingelfingen (DE)

( * ) Notice: Subject to any disclaimer, the term of this patent is extended or adjusted under 35 U.S.C. 154(b) by 179 days.

(21) Appl. No.: 13/716,378

(22) Filed: Dec. 17, 2012

(65) Prior Publication Data

US 2013/0160564 A1  Jun. 27, 2013

(30) Foreign Application Priority Data

Dec. 23, 2011  (DE) .................. 20 2011 109 511 U
Feb. 6, 2012  (DE) .................. 20 2012 001 121 U

(51) Int. Cl.
*G01F 1/78*  (2006.01)
*G01F 5/00*  (2006.01)
*G01F 1/76*  (2006.01)
*G01F 1/684*  (2006.01)

(52) U.S. Cl.
CPC .. *G01F 5/00* (2013.01); *G01F 1/76* (2013.01); *G01F 1/6842* (2013.01)

(58) Field of Classification Search
USPC ............................. 73/204.25, 204.21, 861.351
See application file for complete search history.

(56) References Cited

U.S. PATENT DOCUMENTS

| 5,054,522 | A | | 10/1991 | Kowanz et al. |
| 5,279,154 | A | * | 1/1994 | Vavra et al. .................. 73/202.5 |
| 5,693,880 | A | * | 12/1997 | Maginnis, Jr. ............... 73/202.5 |
| 6,655,207 | B1 | | 12/2003 | Speldrich et al. |
| 6,681,623 | B2 | * | 1/2004 | Bonne et al. .................... 73/202 |
| 7,059,184 | B2 | | 6/2006 | Kanouda et al. |
| 7,296,465 | B2 | * | 11/2007 | Ding et al. .................. 73/202.5 |
| 7,467,027 | B2 | * | 12/2008 | Ding et al. .................... 700/282 |
| 7,874,208 | B2 | * | 1/2011 | Redemann et al. ............. 73/202 |
| 2008/0016957 | A1 | * | 1/2008 | Suzuki ........................ 73/204.21 |
| 2009/0095068 | A1 | * | 4/2009 | Redemann et al. ............. 73/202 |

FOREIGN PATENT DOCUMENTS

| DE | 3917396 | 12/1990 |
| DE | 29510039 | 8/1995 |
| DE | 102004019521 | 11/2005 |
| DE | 102004021304 | 11/2005 |
| EP | 2098832 | 9/2009 |

OTHER PUBLICATIONS

German Search Report received on Apr. 27, 2012.

* cited by examiner

*Primary Examiner* — Jewel V Thompson
(74) *Attorney, Agent, or Firm* — Lowe Hauptman & Ham, LLP

(57) ABSTRACT

A mass flow measuring or controlling device having a base body, a flow channel and a sensor module which comprises a sensor element and which can be coupled to an electronic unit, the flow channel having a measuring channel section which is in fluidic contact with the sensor element is characterized in that the sensor module comprises a sensor support part and a stabilizing element for stabilizing the sensor support part in the region of the measuring channel section.

19 Claims, 3 Drawing Sheets

MASS FLOW MEASURING OR CONTROLLING DEVICE

CROSS REFERENCE TO RELATED APPLICATION

This application claims the priority of German Patent Application No. 20 2011 109 511.1 filed on Dec. 23, 2011 and German Patent Application No. 20 2012 001 121.9 filed on Feb. 6, 2012 in the German Patent and Trade Mark Office (DPMA), the disclosure of which is incorporated herein in their entirety by reference.

TECHNICAL FIELD

The invention relates to a mass flow measuring or controlling device.

BACKGROUND OF THE INVENTION

Mass flow measuring or controlling devices are for example known from document DE 10 2004 019 521 A1 and are intended to reliably measure or control flow rates of gases or liquids with high precision also over a relatively large flow range.

Mass flow measuring or controlling devices which are based on a thermal measuring principle usually comprise a sensor element which is arranged on a sensor support part and adjoins a flow channel.

There are two basic variants of mass flow measuring or controlling devices of this type with respect to the flow channel. The design mostly used so far provides that a main flow channel is provided in the housing, from which a bypass channel is branched off. The sensor element measures at the bypass channel. In the region of the main flow channel, which in terms of flow is parallel to the bypass channel, a flow resistance section is present to generate a drop in pressure. The design of the mass flow measuring or controlling device alternative thereto does not provide any bypass channel. Rather, the entire fluid flow will flow past the sensor element.

In the embodiment having a bypass channel, the latter requires a certain minimum length which is due to the fact that it is arranged above a flow divider generating a drop in pressure, so that only part of the entire flow flows through the bypass channel. Furthermore, flow conditions which are as constant as possible are to be achieved in a measuring section arranged in the bypass channel.

For a constant measuring accuracy, it is decisive that the spatial arrangement between the sensor element and the measuring section in the flow channel remains unchanged over the service life of the mass flow measuring or controlling device.

In particular in case of low flow rates, for example at 100 ml/min up to 1 ml/min, it is difficult to achieve a high control accuracy of 1-2%, for example. A pressure dependence of the control accuracy having a particularly high impact in this region is determined. A pressure loading on the parts contacted by the medium in the device can undesirably lead to the fact that the sensor support part slightly moves away from the flow channel in the region of the sensor element by a bending of the sensor support part, which results in a degradation of the control accuracy.

It is therefore the object of the invention to provide a mass flow measuring or controlling device which does not include the drawbacks mentioned above, which is stable under compressive loading and which has a high control accuracy, also in the range of very low flow rates of up to 1 ml/min.

SUMMARY OF THE INVENTION

The mass flow measuring or controlling device according to the invention has a base body, a flow channel and a sensor module which comprises a sensor element and which can be coupled to an electronic unit. The flow channel has a measuring channel section which is in fluidic contact with the sensor element. The sensor element comprises a sensor support part which is in particular cuboidal, and a stabilizing element for stabilizing the sensor support part in the region of the measuring channel section.

To bring the sensor element in fluidic contact with the flow channel, the sensor support part has to be mounted to the mass flow measuring or controlling device. To this end, fastening means, such as screws, are often used. The fastening means are to be arranged outside the flow channel to prevent the flow of the medium in the flow channel from being unfavorably influenced. Furthermore, a medium contact with the fastening means is to be avoided for durability and contamination reasons.

Due to the design or the geometry, regions of the sensor support part which directly adjoin the fastening means can be exposed to a higher compressive loading than regions which are arranged at a larger distance from the fastening means. As the fastening means are for example arranged outside the flow channel, especially the region of the sensor support part in which the sensor element is located is less resistant to a compressive loading. This drawback counteracts the stabilizing element.

The stabilizing element may provide that the sensor support part still withstands high pressures in the region of the measuring channel section which is in fluidic contact with the sensor element and does not directly adjoin the fastening means. This means that the fluidic contact between the measuring channel section and the sensor element is always ensured under compressive load and that the sensor support part does not undesirably slightly move away from the adjacent flow channel, for example by a bending in the region of the sensor element. The measuring accuracy is thus improved.

The measuring channel section may be arranged outside the base body, i.e. the flow runs first in the base body to be then guided out thereof. This variant has the advantage that the sensor module is placed from the outside onto the base body and that only branch canals of the flow channel within the body are to be guided from the base body to the outside. A replacement of the sensor module is also very simple in this variant. It must however be pointed out that it would of course also be possible to completely open the base body in the region of the measuring channel section and to close it again on an open side using the sensor module.

The flow channel present within the base body is referred to as main flow channel. In case no bypass is provided, it is possible to guide the flow from this main flow channel outwards to the sensor module and then back again into the base body. Alternatively, the main flow channel completely extends through the base body, and a bypass channel to the main flow channel forms the so-called measuring channel section along a section.

It is rather possible to dispense with the bypass in case of low mass flows than in case of high mass flows.

To simplify the manufacture of the base body with the main flow channel, a kind of modular system is provided. Depending on whether the mass flow measuring or controlling device is designed for large or small mass flows, an insert placed in the main flow channel is configured as a separation or as a throttling point. In case the insert is intended to cause a flow separation, two separate sections are formed in the main flow channel, which are brought in flow communication by a connecting channel. A section of the connecting channel is then the measuring channel section.

The sensor support part and/or the stabilizing element can be configured so as to be plate-shaped, in particular cuboidal. Plate-shaped parts are favorable in view of their manufacture and handling. Furthermore, they can be sealed in a simple manner. It is favorable to adjust the geometry of the sensor support part and that of the stabilizing element to each other. The devices can thus in particular also be mounted in a space-saving manner.

The stabilizing element may have an arched shape and presses the sensor support part towards the base body by means of its bulged section, in particular in the region of the sensor element. The stability of the system is thus increased especially at that point at which the measured values are acquired, which directly improves the measuring accuracy.

Moreover, the arched shape of the stabilizing element has the advantage that a stabilizing force originating therefrom is introduced into the system in a very purposeful and directed manner. The stabilizing force has the strongest effect along the apex line of the arch.

The stabilizing element can be configured as a spring plate. A spring plate is particularly suitable to absorb possibly occurring pressure impulses. The spring force of the spring plate increases the tightness and counteracts a possible bending of the sensor support part due to the fluid pressure. Alternatively, it is of course also possible to use other spring elastic elements.

The stabilizing element has in particular substantially the same base as the sensor support part such that it completely covers the latter on one side.

The sensor support part and the stabilizing element are locked to the base body by fastening means. The sensor support part and the stabilizing element are thus spatially in proximity to the flow channel arranged in the base body. Short medium channels or ducts have a favorable effect on measurement dynamics.

The sensor support part and the stabilizing element can be detachably fastened to the base body so as to be stacked on top of each other, the stabilizing element stabilizing the sensor support part on the rear side.

The stabilizing element immediately contacts the sensor support part on the rear side of the support part, e.g. in the region of the sensor element.

The sensor support part, the stabilizing element, the electronic unit and the optional fluid channel plate are all plate-shaped and have substantially the same basic surface area.

A detachable fastening simplifies maintenance works of the mass flow measuring or controlling device possibly required or desired during customer use. If necessary, the sensor support part and/or the stabilizing element can also simply be replaced.

Screws or clips, for example, which cooperate with threads or grooves to be provided in the base body, are suitable as fastening means.

The measuring channel section is e.g. configured as a recess in an exterior surface of the base body adjacent to the sensor support part. As the main flow channel is realized in the base body from which the flow is guided to the measuring channel section, short fluidic connections between the main flow channel in the base body and the measuring channel section can be produced in this arrangement of the measuring channel section.

However, it is also possible that the measuring channel section is arranged as a recess in an exterior surface of a separate fluid channel plate, which is adjacent to the sensor support plate, the fluid channel plate being detachably fastened to the base body. This has the advantage that the modularity is increased, which means that the fluid channel plates may be configured in an application-specific manner and, if necessary, can simply be replaced.

The geometry of the fluid channel can be adapted to the properties of the medium. The measuring channel section can, for example, be configured as a smaller or larger recess in the fluid channel plate depending on the viscosity of the medium. Similarly, the material of which the fluid channel plate is manufactured may also be selected depending on the medium.

The measuring channel section can be closed by a side face of the adjacent sensor support part. In this way, the measuring channel section is configured as a contour within the fluid channel plate or the base body and can be sealed in a simple manner.

The sensor element has electrical contacts for the coupling to the electronic unit, so that the measured values acquired by the sensor element can be evaluated directly.

The electrical contacts can be guided through the sensor support part and the stabilizing element to an exterior surface facing away from the base body. This has the advantage that the electronic unit does not come into contact with the medium, as a result of which the service life of the electronic components is increased.

The electronic unit may be part of the device and is configured as a printed circuit board which is detachably fastened to the base body along with the sensor support part and the stabilizing element. The mass flow measuring or controlling device can therefore be manufactured as a compact unit.

An interface for transmitting data acquired by the sensor element is e.g. arranged on the printed circuit board. The interface can, for example, be configured as a bus interface via which measured data is transmitted to an evaluation unit. However, it is also possible to connect a display.

The sensor module, the electronic unit and the optional fluid channel plate can be stacked on top of each other and configured as a pre-mounted unit, which is favorable with respect to assembling and stocking.

The sensor module is detachably fastened, in particular screwed to the base body as a pre-mounted unit. The fastening can however also be realized using other known methods, by means of clips, for example.

DETAILED DESCRIPTION

Figure 1:
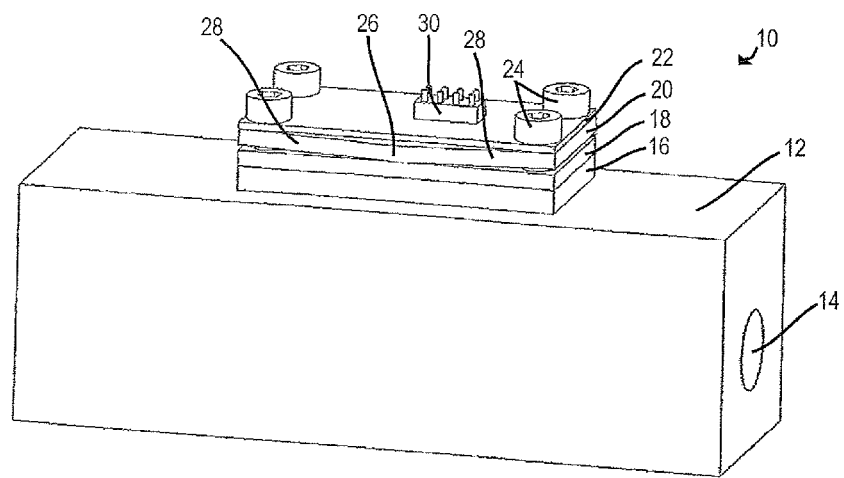
FIG. 1 is a perspective top view on a mass flow measuring or controlling device according to the invention in the pre-mounted state.

FIG. 1 shows a perspective top view on a mass flow measuring or controlling device 10 according to the invention in a pre-mounted state, having in its interior at least one flow channel. A main flow channel 14 projects in the longitudinal direction through a substantially cuboidal base body 12.

A fluid channel plate 16, a sensor support part 18, a stabilizing element 20 and an electronic unit 22 are arranged stacked on top of each other on a side face of the base body 12 which is e.g. parallel to the longitudinal direction, and are detachably connected to the base body 12 by fastening means 24, for example screws. It is however also possible to use other fastening means, such as clips or brackets.

The screws are shown in FIG. 1 to be not yet tightened up to an end position.

The fluid channel plate 16, the sensor support part 18, the stabilizing element 20 and the electronic unit 22 each have a cuboidal, in particular plate-shaped geometry. The plate-shaped geometry permits a very compact and space-saving design. It is however also possible to choose a different geometry.

Figure 2:
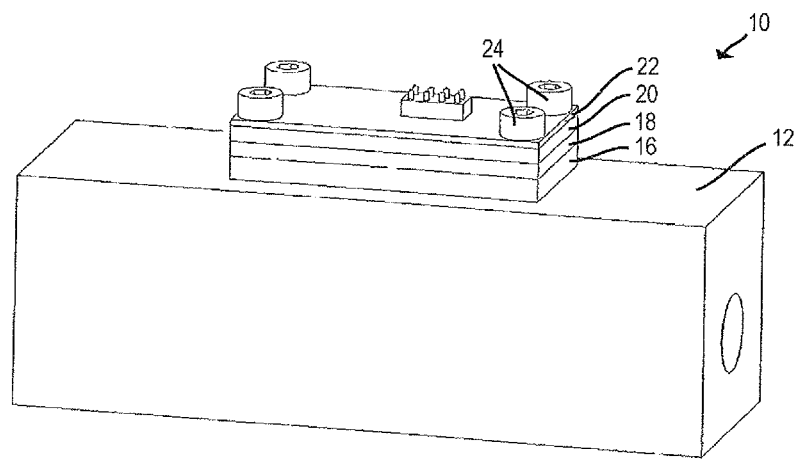
FIG. 2 is a perspective top view on a mass flow measuring or controlling device according to the invention in the mounted state.
Figure 3:
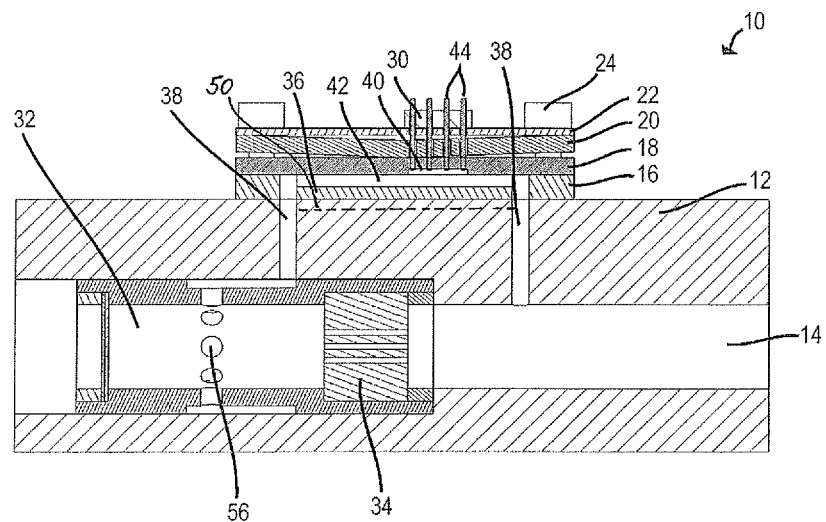
FIG. 3 is a longitudinal sectional view of the mass flow measuring or controlling device according to the invention of FIG. 1.
Figure 4:
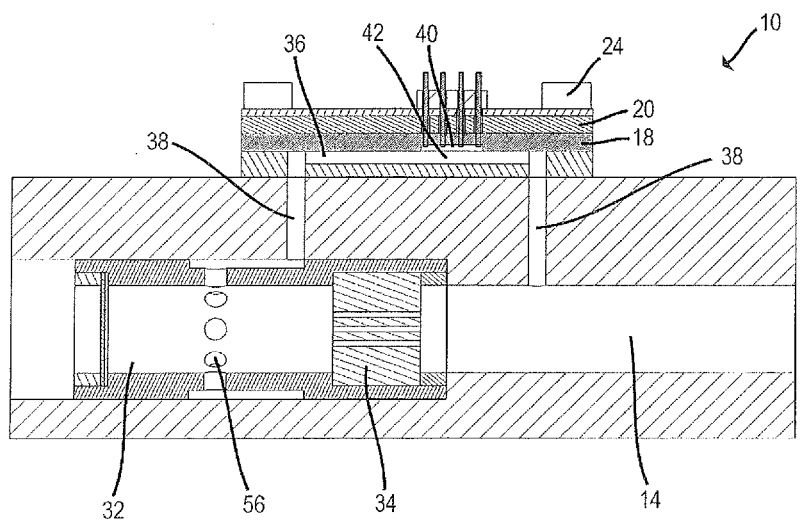
FIG. 4 is a longitudinal sectional view of the mass flow measuring or controlling device according to the invention of FIG. 2.

The sensor support part 18 comprises a sensor element which is not shown in FIGS. 1 and 2 and is described in detail in the descriptions of FIGS. 3 and 4.

Whereas the fluid channel plate 16, the sensor support part 18 and the electronic unit 22 are configured in a flat manner on opposite exterior surfaces, the stabilizing element 20 has an arched shape having a bulged section 26 and two legs 28. The bulged section 26 of the stabilizing element 20 rests against the sensor support part 18 in the region of the sensor element.

The two legs 28 are in particular bent through 2° with respect to the sensor support part 18 so as to be directed away therefrom.

The stabilizing element 20 has in particular a thickness of 2 mm.

The stabilizing element 20 is e.g. configured as a spring element and made of a spring steel. However, other stabilizing elements 20 are also conceivable which press onto the sensor support part 18 in the region of the sensor element.

The electronic unit 22 has an interface 30 for transmitting measured values acquired by the sensor element. The interface 30 is e.g. configured as an internal bus interface for the communication with an evaluation or regulation unit (not represented). The data can however also be transmitted in other known data transmission ways to the evaluation or regulation unit, for example electrically, inductively, by radio or in a wireless manner. The interface 30 is configured correspondingly depending on the desired data transmission way.

In contrast to FIG. 1, FIG. 2 shows the fastening means 24 in the mounted state in their end position, the legs 28 of the stabilizing element 20 being pressed towards the sensor support part 18 such that the sensor support part 18 and the stabilizing element 20 take positions that are substantially parallel to each other. The stabilizing element 20 presses onto the sensor support part 18 in the region of the sensor element 40 and stabilizes the latter on the rear side, as a result of which the sensor support part 18 remains dimensionally stable also in case of a high compressive loading.

FIG. 3 shows the mass flow measuring or controlling device 10 of FIG. 1 in the pre-mounted state.

The base body 12 is also passed through by the main flow channel 14. The fluid channel plate 16, the sensor support part 18, the stabilizing element 20 and the electronic unit 22 are arranged stacked on top of each other on a side face of the base body 12 and are detachably connected to the base body 12 by fastening means 24, as already represented in FIG. 1.

Sensor support part 18, stabilizing element 20, electronic unit 22 and fluid channel plate 16 are all plate-shaped and have substantially the same basic surface area and may have different thicknesses.

A flow conditioning insert 32 having a flow resistance element 34 is arranged axially in the main flow channel 14. A bypass channel 36 parallel to the main flow channel and having two connecting channels 38 is branched off from the main flow channel 14 and guided back such that the flow resistance element 34 is arranged between the two connecting channels 38 to generate a pressure difference.

The flow channel in the device 10 comprises the main flow channel 14 and the bypass channel 36 along with the connecting channels 38.

The bypass channel 36 extends laterally to the outside of the base body 12 into the fluid channel plate 16.

The bypass channel 36 is configured there as a recess in the fluid channel plate 16 open upwards, which is arranged on a side face of the base body 12. The fluid channel plate 16 is optional, as the bypass channel 36 can alternatively also be configured as a recess 50 on the side face of the base body 12 (see broken line in FIG. 3). The connecting channels 38 open into the fluid channel plate 16 and merge into the bypass channel 36.

The bypass channel 36 is closed by an adjacent side face of the sensor support part 18 on which the sensor element 40 is arranged.

The sensor element 40 is in fluidic contact with the bypass channel 36 in the region of a measuring channel section 42, this region being stabilized on the rear side by the stabilizing element 20.

The sensor element 40 has electrical contacts 44 which are guided through the sensor support part 18 and the stabilizing element 20 to an exterior surface facing away from the base body 12. The electrical contacts 44 open into the interface 30 which is arranged onto the electronic unit 22.

The electronic unit 22 is e.g. configured as a printed circuit board and, as described above, is detachably fastened to the base body 12 along with the optional fluid channel plate 16, the sensor support part 18 and the stabilizing element 20 by fastening means 24.

The optional fluid channel plate 16, the sensor support part 18, the stabilizing element 20 and the electronic unit 22 are e.g. assembled as a pre-mounted unit which is detachably fastened to the base body 12.

It is however also possible to first connect the sensor support part 18 to the stabilizing element 20 and to detachably mount it directly to the base body 12 in case the measuring channel section 42 is configured as a recess in a side face of the base body.

It is essential to the invention that the sensor support part 18 is stabilized by the stabilizing element 20 against the fluid pressure in the region of the measuring channel section 42, so that it is ensured that the sensor element 40 is in constant fluidic communication with the measuring channel section 42 also under a compressive load by the medium, and the sensor support part 18 is not undesirably bent, so that the measurement accuracy is increased and almost pressure independent.

FIG. 4 represents a front view of the mass flow measuring or controlling device 10 of the invention according to FIG. 2, also in the mounted state and in a half section.

In contrast to FIG. 3, the fastening means 24 are in their end position. The stabilizing element 20 rests substantially in a parallel manner on the sensor support part 18 and presses on the rear side against the sensor support part 18 in the region of the sensor element 40, so that the fluidic contact between the sensor element 40 and the bypass channel 36 is reliably ensured in the region of the measuring channel section 42.

Figure 5:
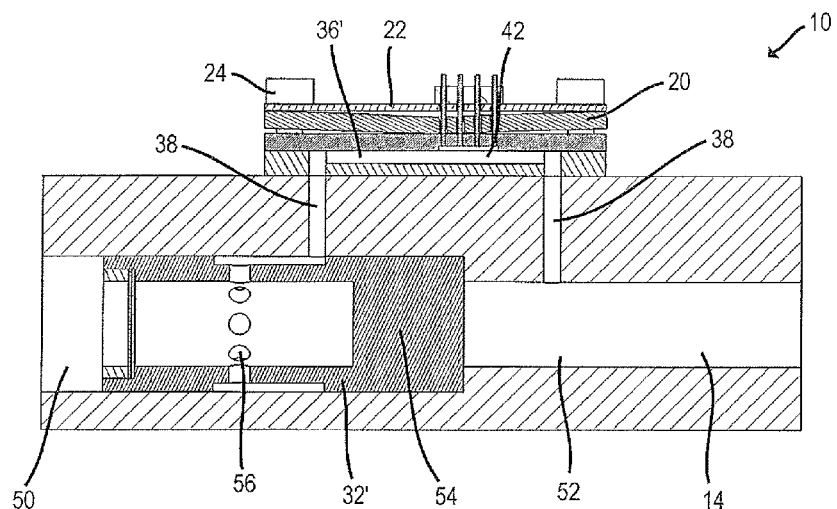
FIG. 5 is a longitudinal sectional view of the mass flow measuring or controlling device of the invention according to a further embodiment.

The embodiment according to FIG. 5 substantially corresponds to the embodiment shown in the previous figures, the reference numbers already introduced being used for the same or similar components. Only the differences are therefore described in detail in the following.

Whereas in the preceding embodiments a main flow channel 14 extending through the base body 12 is provided, the main flow channel 14 is separated in the embodiment according to FIG. 5. It results two sections 50, 52 of the main flow channel 14. The separation of these two sections 50, 52 is for example realized by an insert 32' which is inserted in the main flow channel 14 and which has a partition wall 54 to fluidically separate the two sections 50, 52.

The flow channel of the mass flow measuring or controlling device 10 is here configured without a bypass. The two sections 50, 52 are brought in flow communication with each other by means of a connecting channel. This connecting channel is composed of the connecting channels 38 already mentioned above and of the channel 36' present in the sensor module, of which one section is the measuring channel section 42.

A stabilizing element 20 is of course also provided in this embodiment, in which the sensor module is configured identically to the preceding sensor modules. The stabilizing element 20 is represented in the compressed position, as in FIG. 4.

Figure 6:
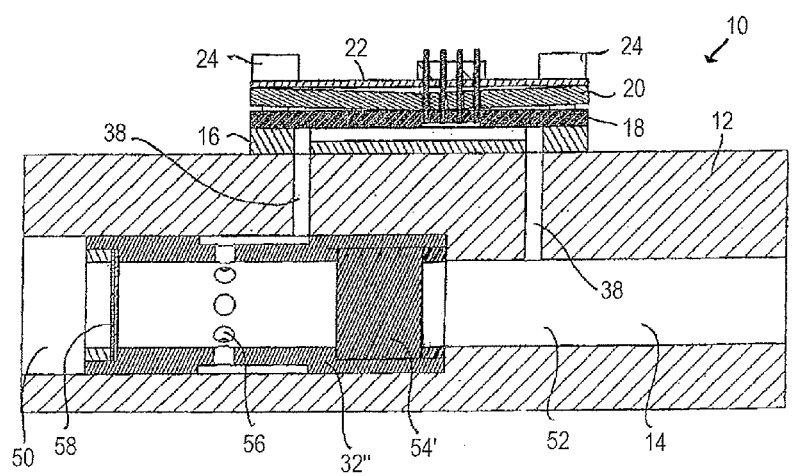
FIG. 6 is a longitudinal sectional view through a mass flow measuring or controlling device slightly modified with respect to the device of FIG. 5.

Instead of the insert 32' with which the connecting wall 54 is integrally formed, it is also possible to use an insert 32" according to FIG. 6. The insert 32" includes an inserted flow-proof partition wall 54' instead of the flow resistance element 34 which is inserted as a separate end wall (see FIG. 4). The advantage of this embodiment is that it is also possible to create a modular system with respect to the inserts 32, 32". Depending on whether a bypass channel is to be present or not, an insert 32 having a flow resistance element 34 or a partition wall 54' is used.

The discs 58 present in the insert 32 to 32" upstream of the so-called discharge opening 56 are filter discs and/resistance elements.

In the embodiment according to FIG. 6, as in those discussed above, the corresponding sensor module is placed from the outside onto the base body 12 and screwed thereto, the stabilizing element 20 being not yet completely flattened in the position shown in FIG. 6, which means that the fastening means 24 are then not entirely tightened.

As shown in the Figures, fluid channel plate 16, plate-shaped sensor support part 18, plate-shaped stabilizing element 20, and plate-shaped electronic unit 22 extend parallel to the flow channel 14, 50, 52 in base body and parallel to measuring channel section 42.

What we claim is:

1. A mass flow controlling device, comprising:
   a base body,
   a flow channel,
   an electronic unit, and
   a sensor module comprising a sensor element, the sensor module configured to be coupled to the electronic unit,
   the flow channel having a measuring channel section being in fluidic contact with the sensor element, and
   the sensor module comprising a sensor support part and a stabilizing element for stabilizing the sensor support part in the region of the measuring channel section,
   wherein the stabilizing element is configured as a spring plate.

2. The mass flow controlling device according to claim 1, wherein the measuring channel section is provided outside the base body.

3. The mass flow controlling device according to claim 1, wherein a main flow channel is arranged within the base body, the measuring channel section being in flow communication with the main flow channel.

4. The mass flow controlling device according to claim 1, wherein a bypass channel bypassing a section of the main flow channel is provided, the measuring channel section being a section of the bypass channel, the bypass channel being branched off from the main flow channel and guided back to the main flow channel.

5. The mass flow controlling device according to claim 1, further comprising a connecting channel producing a flow communication between two sections of the main flow channel which are provided in the base body and are separated from each other within the base body, the measuring channel section being a section of the connecting channel.

6. The mass flow controlling device according to claim 1, wherein the sensor support part and the stabilizing element are detachably fastened to the base body so as to be stacked on top of each other, and wherein the stabilizing element stabilizes the sensor support part on the rear side and contacts the sensor support part on its rear side.

7. The mass flow controlling device according to claim 1, wherein the sensor support part has a side face, the side face of the sensor support part closing the measuring channel section.

8. A mass flow controlling device, comprising:
   a base body,
   a flow channel,
   an electronic unit, and
   a sensor module comprising a sensor element, the sensor module configured to be coupled to the electronic unit,
   the flow channel having a measuring channel section being in fluidic contact with the sensor element, and
   the sensor module comprising a sensor support part and a stabilizing element for stabilizing the sensor support part in the region of the measuring channel section,
   wherein the sensor support part and the stabilizing element are locked to the base body by fastening means.

9. The mass flow measuring device according to claim 8, wherein at least one of the sensor support part and the stabilizing element is configured so as to be one of plate-shaped and cuboidal.

10. The mass flow measuring device according to claim 8, wherein the measuring channel section is configured as a recess in an exterior surface of the base body adjacent to the sensor support part.

11. The mass flow measuring device according to claim 8, wherein the measuring channel section is arranged as a recess in an exterior surface of a separate fluid channel plate adjacent to the sensor support part, the fluid channel plate being detachably fastened to the base body.

12. A mass flow controlling device, comprising:
    a base body,
    a flow channel,
    an electronic unit, and a sensor module comprising a sensor element, the sensor module configured to be coupled to the electronic unit, the flow channel having a measuring channel section being in fluidic contact with the sensor element, and the sensor module comprising a sensor support part and a stabilizing element for stabilizing the sensor support part in the region of the measuring channel section, wherein the sensor module, the electronic unit and a separate fluid channel plate are stacked on top of each other and are configured as a pre-mounted unit.

13. The mass flow controlling device according to claim 12, wherein the sensor element has electrical contacts for the coupling to the electronic unit.

14. The mass flow controlling device according to claim 13, wherein the electrical contacts are guided through the sensor support part and through the stabilizing element to an exterior surface facing away from the base body.

15. The mass flow controlling device according to claim 13, wherein the electronic unit is configured as a printed circuit board which is detachably fastened to the base body along with the sensor support part and the stabilizing element.

16. The mass flow controlling device according to claim 15, wherein an interface for transmitting data acquired by the sensor element is arranged on the printed circuit board.

17. The mass flow controlling device according to claim 12, wherein the sensor module, the electronic unit and the optional fluid channel plate substantially have the same basic surface area.

18. The mass flow controlling device according to claim 17, wherein the stabilizing element has an arched shape and has a bulged section and presses the sensor support part in a direction against the base body by means of the bulged section.

19. The mass flow controlling device according to claim 12, wherein the sensor module is detachably fastened to the base body as a pre-mounted unit.

* * * * *